(12) United States Patent
Marche et al.

(10) Patent No.: US 11,338,872 B2
(45) Date of Patent: May 24, 2022

(54) AUTONOMOUS DEVICE FOR ALERT IN CASE OF VEHICLE MOTION

(71) Applicant: ORANGE, Paris (FR)

(72) Inventors: Mikaël Marche, Saint Pierre d'Allevard (FR); Frédéric Dutronc, Chaville (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 16/090,109

(22) PCT Filed: Mar. 9, 2017

(86) PCT No.: PCT/FR2017/050534
§ 371 (c)(1),
(2) Date: Sep. 28, 2018

(87) PCT Pub. No.: WO2017/168069
PCT Pub. Date: Oct. 5, 2017

(65) Prior Publication Data
US 2019/0127004 A1     May 2, 2019

(30) Foreign Application Priority Data
Mar. 30, 2016  (FR) .......................................... 1652721

(51) Int. Cl.
*B62H 5/20*      (2006.01)
*B60R 25/102*    (2013.01)
(Continued)

(52) U.S. Cl.
CPC .............. *B62H 5/20* (2013.01); *B60R 25/102* (2013.01); *B62J 50/21* (2020.02)

(58) Field of Classification Search
None
See application file for complete search history.

(56) References Cited

U.S. PATENT DOCUMENTS 6,291,901 B1 *  9/2001  Cefo ........................ B60L 8/00
                                                    290/1 R
6,420,850 B1 *  7/2002  Thurman ................. H02J 9/06
                                                    320/130
(Continued)

FOREIGN PATENT DOCUMENTS

DE     20 2013 007 614      11/2013
EP         1 522 981          4/2005
KR        20100130925 A2     12/2010

OTHER PUBLICATIONS

International Search Report dated Jun. 27, 2017, issued in PCT Application No. PCT/FR2017/050534, 6 pages.

*Primary Examiner* — Joseph H Feild
*Assistant Examiner* — Pameshanand Mahase
(74) *Attorney, Agent, or Firm* — Knobbe, Martens, Olson and Bear, LLP

(57) ABSTRACT

The invention relates to an autonomous device for alert in case of motion of a vehicle, comprising:
  an electrical energy recovery facility (11) adapted to recover electrical energy generated by rotation of a wheel (2) of the vehicle,
  a temporary accumulation module (12) adapted to store at least part of said electrical energy,
  a telecommunication module (13) adapted to be supplied by the temporary accumulation module, and configured to emit, in response to its being supplied with electrical energy by the temporary accumulation module (12), a communication destined for a network (3) for dispatching an alert message destined for a terminal (4).

13 Claims, 5 Drawing Sheets

(51) Int. Cl.
  *B62J 99/00*   (2020.01)
  *B62J 45/40*   (2020.01)
  *B62J 6/04*    (2020.01)
  *B62J 50/21*   (2020.01)

(56) References Cited

U.S. PATENT DOCUMENTS

| | | | |
|---|---|---|---|
| 2005/0149741 A1 | 7/2005 | Humbel | |
| 2010/0060456 A1* | 3/2010 | Forster | G06K 19/0707 340/572.7 |
| 2013/0150028 A1* | 6/2013 | Akins | H04W 4/02 455/427 |
| 2015/0139423 A1 | 5/2015 | Hildebrandt et al. | |
| 2015/0202966 A1* | 7/2015 | Oyama | B60L 58/12 701/22 |
| 2015/0270712 A1* | 9/2015 | Kanayama | H02J 3/383 307/64 |
| 2015/0274027 A1* | 10/2015 | Crombez | B60L 11/1853 701/22 |
| 2016/0124053 A1* | 5/2016 | Akaishi | G01R 31/371 701/33.4 |
| 2016/0221448 A1* | 8/2016 | Pritchard | B60L 7/24 |

\* cited by examiner

| ID # 4 | ID # 1 | POS | ALERTE |
|---|---|---|---|
| IMEI(4) | IDM(1) | POS(1) | OK |
| IMEI(41) | IDM(11) | POS(11) | KO |
| ... | ... | ... | ... |

FIG. 5

AUTONOMOUS DEVICE FOR ALERT IN CASE OF VEHICLE MOTION

The field of the invention relates to devices which warn of motion of a vehicle, in particular a bicycle. This motion may for example be related to theft of the vehicle.

Among all the devices which warn of vehicle motion, particularly for a bicycle, there are known systems which are based on communication via mobile networks, notifying a user of the theft of the vehicle by means of an application running on his or her mobile phone.

The core of these systems is based on motion detection. Known warning systems associate motion of the vehicle with theft and notify the user with an alert message.

One of the disadvantages associated with this type of warning system relates to the fact that these systems generally rely on using batteries to supply electrical energy to the system components. The use of a radio module in particular in these warning systems requires significant energy consumption during the connection phase. The presence of these batteries requires the user to recharge them frequently. If the battery is not charged, these systems become inoperative.

The invention aims to improve this situation.

To this end, the invention relates to an autonomous warning device which warns of motion of a vehicle, comprising:
- an electrical energy recovery unit for recovering energy generated by rotation of a wheel of the vehicle,
- a temporary accumulation module for storing at least a portion of the electrical energy,
- a telecommunication module adapted to be supplied power by the temporary accumulation module, and configured to emit, in response to its being supplied with electrical energy by the temporary accumulation module, a communication to a network in order to send an alert message to a terminal.

Thus, the temporary energy accumulation module, in cooperation with the energy recovery unit, renders the warning system completely autonomous, thus providing the possibility of supplying power to a telecommunication module from almost the first rotations of the vehicle wheel.

In one embodiment, the telecommunication module comprises a memory which stores identification data of the device in order to establish, in a database of a server connected to the network, an association between said identification data of the device and data representative of an address of the terminal. Thus, the communication sent by the telecommunication module to the network can include only the identification data of the device. The device can then have only a simple memory of small capacity for storing only the identification data of the device and thereby enabling the telecommunication module to operate.

In this embodiment, the communication comprises the identification data of the device and is sent to the network in broadcast mode. "Broadcast mode" is understood to mean a mode in which the communication is not addressed directly to specific equipment. Moreover, the communication may contain only the above identification data with no particular destination address. For example, this communication can be transmitted in "point-to-point" mode or in "broadcast" mode (the equipment not concerned and receiving the communication then being arranged to ignore it or to retransmit it to neighboring devices).

In this embodiment, the network can be a wide area wireless network, based on a LPWA protocol ("Low Power Wide Area"). Such a protocol enables communication at low bandwidth and offers the advantage of wide reach for low power consumption by the telecommunication module. More specifically, it can be the LoRaWAN® protocol (a registered trademark of Semtech Corporation) or, alternatively, the SigFox protocol (registered trademark).

In such an embodiment, the communication is therefore not addressed to a particular item of equipment, and the identification data of the autonomous device contained in the communication are sufficient for this communication to be usable by a server managing said database.

In one embodiment, the energy recovery unit is adapted to convert at least a portion of the mechanical energy supplied by rotation of the vehicle wheel into electrical energy.

According to an exemplary embodiment, the energy recovery unit comprises at least a first magnet fixed to the wheel and a second magnet fixed to the vehicle and immobile within the reference system of the vehicle, such that the rotational motion of the vehicle wheel causes an interaction between the first and second magnets, generating electrical energy. Such an embodiment, here based on an electromagnetic micro-generator, eliminates the friction that can be found in other embodiments (for example using a dynamo). In addition, this embodiment is inexpensive, as two magnets are sufficient for the design of the energy recovery unit of the device.

In this exemplary embodiment, the temporary accumulation module is connected to the magnet that is stationary with respect to the wheel.

In another exemplary embodiment, the energy recovery unit comprises a dynamo. This embodiment has the advantage of not being sensitive to mechanical vibrations of the wheel (as is the case with magnets generating electrical energy). It is also inexpensive in design, since a dynamo and an electrical connection are sufficient for the design of the energy recovery unit. For example, the dynamo can be attached to the hub of the vehicle wheel.

According to one aspect of the invention, the temporary accumulation module is configured to supply the telecommunication module with electrical energy in response to reaching or exceeding a predetermined threshold for the electrical energy stored in the temporary accumulation module. Reaching the threshold is characteristic of vehicle motion. Reaching or exceeding the threshold is accompanied by discharging the temporary accumulation module in order to power the telecommunication module. This aspect of the invention is also particularly advantageous. Indeed, the use of a LPWA protocol (for "Low Power Wide Area", such as LoRaWAN or SigFox protocols) for the operation of the telecommunication module means that a small amount of electrical energy is sufficient to supply power to the telecommunication module. The threshold to be reached in the temporary accumulation module is very, low. A simple capacitor can therefore be sufficient for creating the temporary accumulation module, which represents a very low cost.

The invention further relates to a method for emitting an alert message in the event of motion of a vehicle having an autonomous device according to the invention, the method comprising at least the following steps implemented in the autonomous device:
- upon receipt of electric power from the temporary energy accumulation module, said electric power being generated by rotation of the vehicle wheel, generating a communication for the purposes of sending an alert message to said terminal, and
- controlling the telecommunication module to send the communication to the network.

In one embodiment, the communication comprises identification data of the autonomous device, and the method further comprises the following steps implemented by a server connected to the network:

upon receipt of the communication, identifying an address of the terminal in a database connected to the server and having an association between said identification data of the device and data representative of an address of the terminal, and emitting the alert message to the address of the terminal, via a second network.

The second network may be for example a cellular network for contacting the terminal. Thus, the server provides the interface between a network carrying communications from standalone devices (for example using a LPWA protocol) and a cellular network (GSM or other type) for transmitting the alert messages to the terminals connected to the second network.

In one embodiment, upon receipt of the communication, the server determines geolocation data representative of the current position of the device and sends them to the terminal.

In this embodiment, the communication is sent in broadcast mode and is received by a plurality of antennas of the network, the server then being able to determine said geolocation data, for example by triangulation. In the case where the communication is received by a single antenna of the network, the server is adapted to determine said geolocation data simply as a function of the amplitude of the received signal. The geolocation data that the server can thus determine can indicate the position of the device with an accuracy ranging from a few tens of meters (for example from 30 and 80 meters) up to a few hundred meters (around a kilometer).

The invention also provides a computer program comprising instructions for implementing the method when said instructions are executed by a computer. The instructions of such a computer program can be divided between a memory of the autonomous device (for example a memory of its telecommunication module) and a memory of the server. Other instructions may possibly also be stored in a memory of the terminal, as described further below with reference to FIG. 6. FIG. 6 illustrates a flow chart of one possible algorithm of a computer program within the meaning of the invention.

The invention also relates to a server for implementing the method and comprising:

a network connection for receiving the communication containing identification data of the autonomous device, a processing circuit for retrieving from the communication the identification data of the autonomous device, a connection to said database in order to map between the identification data of the autonomous device and data representative of an address of the terminal, and a connection to a second network to which the terminal is connected, in order to send the alert message to the address of the terminal.

The invention will be better understood by reading the following detailed description, given solely by way of example and with reference to the accompanying drawings, wherein:

FIG. 5 illustrates a database of a server of the system of FIG. 1; and

Figure 1:
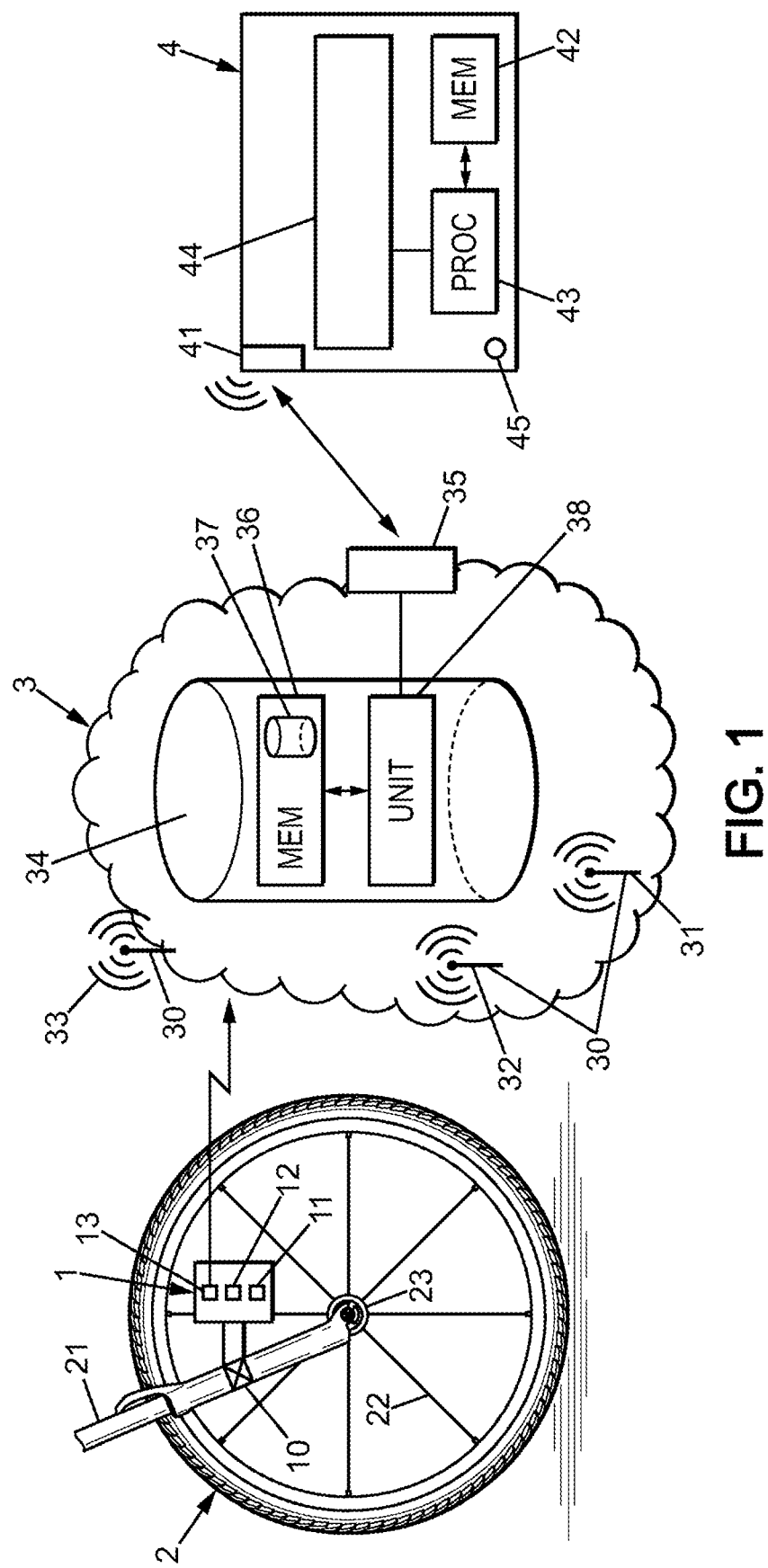
FIG. 1 is a schematic illustration of a system comprising an autonomous warning device according to the invention.

FIG. 1 illustrates a system comprising an autonomous warning device 1 according to the invention. FIG. 1 further shows a wheel 2 of a vehicle, a telecommunication network 3, and a terminal 4.

The vehicle, of which only one wheel 2 is shown in FIG. 1, comprises one or more wheels intended to be set into motion by a mechanical force. For example, this force is provided by a motor or by a user. In the example of FIG. 1, the vehicle is a bicycle. Thus, besides the wheels, the vehicle may comprise a fork 21 to which at least one wheel is connected.

The device 1 is configured to emit a communication to a network 3, in particular in the event of motion of the vehicle. This motion corresponds for example to theft of the vehicle. More specifically, it is configured to emit the communication in response to rotation of the wheel 2 of the vehicle in order to send an alert message to the terminal 4.

The device 1 is intended to be fixed to the vehicle means of a fastener 10. For example, it is fixed to the fork 21 of the vehicle via this fastener 10. Alternatively, the device 1 may be fixed to any other part of the vehicle, such as a vehicle frame or the like.

Alternatively, the device 1 may be integrated into an element of the vehicle, for example molded into a hollow part during manufacture of the vehicle. Such an embodiment typically allows considering applications other than a simple anti-theft warning system. For example, the current geolocation of the vehicle can be displayed on the user's smart phone, indicating the number of kilometers traveled, possibly suggestions, or any other information that the user might want. It is thus understood that since the device is autonomous (and does not need to be detached to recharge a battery contained within it), many applications can be considered other than a warning application specifically for cases of theft.

The device 1 comprises an energy recovery unit 11, a temporary energy accumulation module 12, and a telecommunication module 13.

The energy recovery unit 11 is configured for recovering electrical energy. More specifically, the energy recovery unit 11 is configured to recover electrical energy generated by rotation of the wheel 2 of the vehicle.

Figure 2:
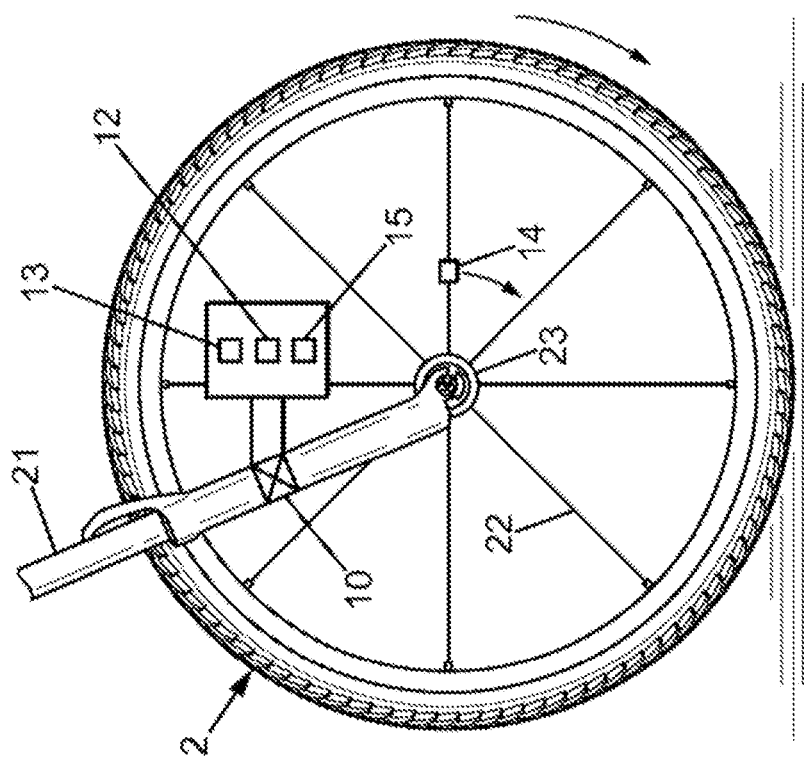
FIG. 2 illustrates an energy recovery unit of the device of FIG. 1.

Referring to FIG. 2, in a first embodiment of the invention, the energy recovery unit 11 comprises a first magnet 14 and a second magnet 15.

The first magnet 14 is fixed relative to the wheel 2 of the vehicle, such that it follows the same rotational movement as the vehicle wheel. In the example of FIG. 2, the first magnet 14 is fixed to a spoke 22 of the vehicle wheel.

The second magnet 15 is fixed to the vehicle so that it is stationary within the reference system of the vehicle. For example, the second magnet 15 is fixed relative to the fork 21 of the vehicle.

The first magnet 14 and second magnet 15 are arranged such that rotation of the wheel 2 of the vehicle leads to interactions between the first magnet 14 and second magnet 15, generating electrical energy by induction (for example electric current fed to the temporary energy accumulation module 12). Advantageously, the minimum distance between the first magnet 14 and second magnet 15 during rotation of the wheel 2 of the vehicle is between 0.5 mm and 1 cm.

Figure 3:
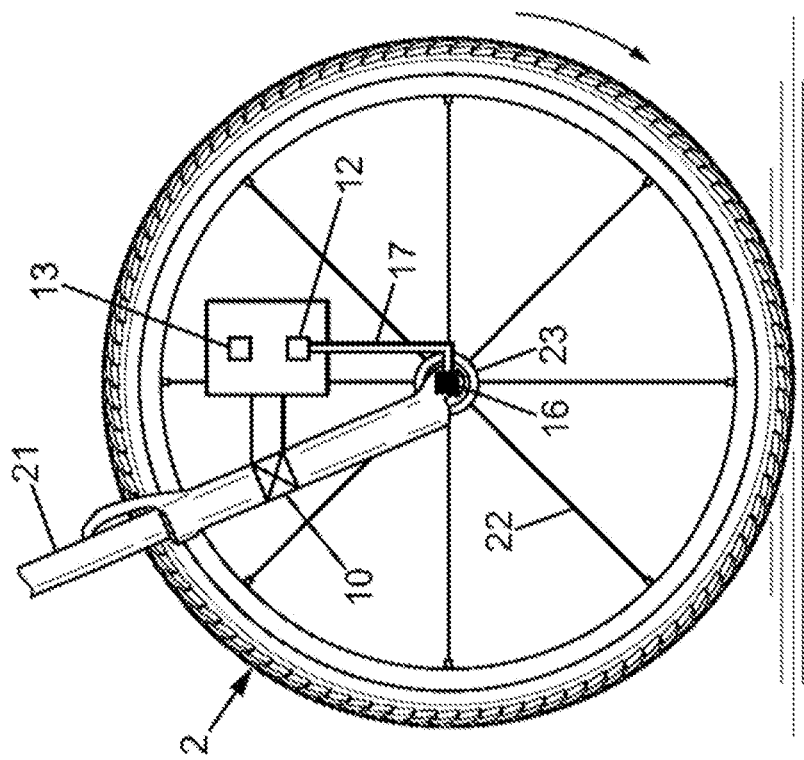
FIG. 3 illustrates an energy recovery unit according to an alternative embodiment.

Referring to FIG. 3, which illustrates a variation of the energy recovery unit, the energy recovery unit 11 comprises a dynamo 16 instead of the magnets 14 and 15. Furthermore, it comprises an electrical connection 17. The dynamo 16 is attached to the wheel and is configured to generate electrical energy in response to rotation. For example, the dynamo 16 is arranged in a hub 23 of the wheel. The electrical connection 17 is adapted here to connect the dynamo 16 to the temporary energy accumulation module 12 in order to deliver the electrical energy generated by the dynamo to the temporary accumulation module.

The energy recovery unit has been described according to two different embodiments. The energy recovery unit may take any form however, its main function being to generate electrical energy from rotation of the wheel.

The temporary energy accumulation module 12 stores the electrical energy generated by rotation of the wheel 2 of the vehicle and recovered by the electrical energy recovery unit 11. This may be for example one or more capacitors having suitable capacity for supplying electrical energy (to the telecommunication module 13) stored in the one or more capacitors, starting at a threshold value.

The temporary energy accumulation module 12 is thus configured to supply power to the telecommunication module 13. More specifically, it is configured to supply power to the telecommunication module 13 in response to reaching or exceeding a predetermined electrical energy threshold. For example, this electrical energy threshold may correspond to a current through the temporary accumulation module 12 of about 30 to 35 mA.

The telecommunication module 13 is configured to emit a communication to the network 3 in order to send an alert message to the terminal 4. More specifically, the telecommunication module 13 is configured to emit the communication in response to receiving power from the temporary accumulation module 12.

Figure 4:
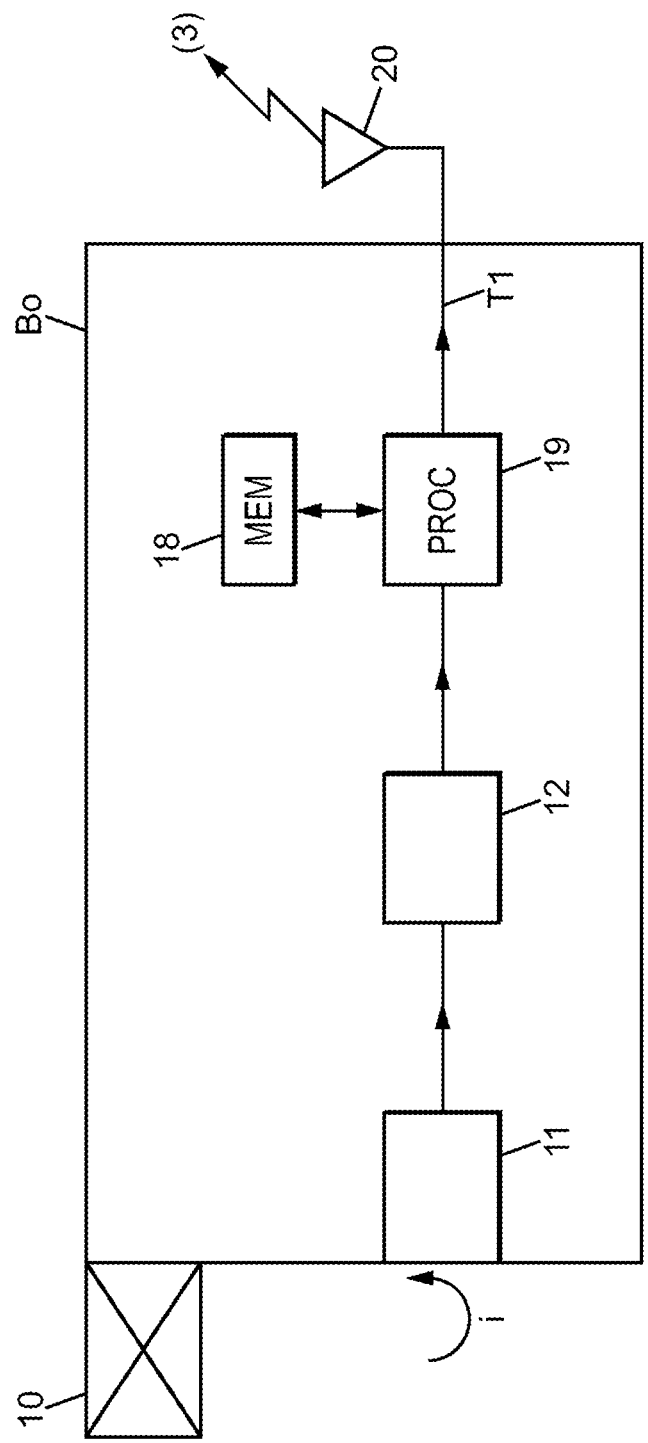
FIG. 4 is a schematic illustration of the Warning device of FIG. 1.

Referring to FIG. 4, the telecommunication module 13 comprises a memory 18, a processor 19 (for example a wireless processor), and an antenna 20. The memory 18 stores lines of code of a computer program which when executed by the processor 19 causes the telecommunication module 13 to function. In addition, the memory 18 comprises identification data for the device 1. As described below, these data are adapted so that a server 34 connected to the network 3 can identify the device 1 in order to route one or more alert messages to the terminal 4.

The processor 19 is configured to generate and supply a signal T1 to the antenna 20. From this signal, the antenna 20 sends over the network 3 the communication thus containing at least the identification data of the device 1 stored in memory 18. Upon receipt of this communication at the server 34, the server 34 is then able to generate an alert message intended specifically for the terminal 4 with which the warning device 1 has been previously associated, as described below.

For example, the memory 18 may be flash memory. The processor 19 can cooperate with the memory 18 to operate spontaneously in response to receiving electrical energy from the temporary energy accumulation module 12 when the energy supplied by the module 12 exceeds a threshold. In particular, the booting of the processor 19 as soon as it receives power may consist of reading instructions from memory 18 for identifying the identification data of the warning device 1, constructing the communication using these data, and controlling the telecommunication module 13 to send this communication.

As a result, the communication is itself representative of the fact that the wheel 2 of the vehicle has been in motion for several rotations. Advantageously, the telecommunication module 13 is configured to emit communications to the network 3 via a communication protocol known as LPWA, the acronym for "Low-Power Wide-Area". Thus, a few rotations can be sufficient to send the above communication.

Advantageously, besides the elements described above, the device 1 comprises a housing BO within which at least some elements of the device are intended to be arranged. For example, the housing BO houses some or all of the energy recovery unit 11, the temporary energy accumulation module 12, and the telecommunication module 13. The housing is for example fixed to the fork 21 of the vehicle via the fastener 10. In the example of FIG. 2, the housing BO comprises the second magnet 15. In the example of FIG. 3, the dynamo 16 can be arranged outside the housing.

Referring again to FIG. 1, the network 3 comprises a plurality of antennas 30, including at least a first antenna 31, a second antenna 32, and a third antenna 33. In addition, a server 34 is connected to the network 3 (for example by being connected to the antennas 30). The server 34 further comprises a communication interface 35 with a second network for communicating with the terminal 4. For example, the server 34 is an information technology infrastructure (IT infrastructure). The server 34 is configured to emit the alert message to the terminal 4 in response to receiving the communication emitted by the telecommunication module 13.

More specifically, the network 3 can be a LPWA network, such as LoRa (trademark) or SigFox (trademark). The communication emitted by the telecommunication module 13 is sent in broadcast mode (all devices, point-to-point, or other) via the network 3, and one or more antennas 31, 32, 33 receive the communication in order to transmit it to the server 34. The communication is emitted without being addressed to a specific item of equipment. For example, each reception by an antenna 31, 32, 33 can correspond to a reception signal having an amplitude that is a function of the distance to the telecommunication module 13 (and therefore to the device 1). In one particular embodiment, it is thus possible to estimate, by triangulation at the server 34, geolocation data of the device 1 representative of a current position of the device, based on the amplitudes of the received signals transmitted by the antennas to the server 34. When the communication is received by only one antenna 30, it is also possible to estimate the geolocation data of the device 1, as a disk centered at the antenna and of a radius determined as a function of the amplitude of the reception signal. The server 34 is thus configured to estimate geolocation data for the device 1. In addition, the communication interface 35 is configured to communicate with the terminal 4 via the second network. The communication interface 35 is for example a 2G, 3G, 4G, GSM, EDGE, GPRS, WiFi, or any other communication interface. The server 34 can thus send an alert message and, if appropriate, the geolocation data of the terminal device 4 via a second network, as described below.

The server 34 comprises a memory 36 and a processor 38. The memory 36 stores lines of code of a computer program whose execution by the processor 38 results in the server 34 functioning as described below. In addition, the processor 38 can be connected to a database 37 (which may be stored in the same memory 36 or in a different memory connected to the processor 38).

Referring to FIG. 5, the database 37 includes identification data of the terminal 4, mapped to the identification data of the device 1. The database 37 may also store, for the same identification data of the terminal 4, a plurality of sets of identification data corresponding to a plurality of different warning devices (the case of one user having a given terminal and a plurality of vehicles with a warning device 1 associated with each vehicle). Conversely, a plurality of identifiers of terminals 4 can be stored which map to the same warning device 1 identification data (the case of multiple users having these terminals and able to take action in the event of theft of the vehicle). In the latter case, an alert message may be sent to multiple devices at once.

The identification data of the terminal 4 uniquely identifies the terminal 4. These data include, for example, a phone number associated with the terminal 4, the IMEI data (International Mobile Equipment Identity), or IMSI data identifying the SIM card of the terminal 4, for example. In the example of FIG. 5, the identification data of the terminal are referenced IMEI(4), and the identification data of the device 1 are referenced IDM(1). Thus, the database can be organized as a lookup table mapping between the identification data of each warning device 1 (denoted IDM(1)) and data concerning this warning device (including contact data for an associated terminal 4, geo location data from the warning device, etc.).

In addition, the database 37 may store the geolocation data of each device 1, for example the latest data collected to date. Alternatively, the database 37 may store previous geolocation data, for example all geolocation data collected over a predetermined length of time. These geolocation data are associated with the device 1, specifically with its identification data. For example, in FIG. 5, the geolocation data of the device 1 are denoted POS(1).

In addition, the database 37 comprises a warning parameter for selectively allowing or preventing the sending of an alert message to the terminal in response to the server receiving a communication emitted by the telecommunication device 13.

This warning parameter can take one of two possible values, for example denoted OK and KO. If the value is OK, the server 34 is configured to send the alert message to the terminal 4 in response to receiving a communication emitted by the telecommunication module. Conversely, if the value is KO, the network is configured not to send an alert message in response to a communication from the device 1. The value OK or KO can be determined by the preferences of a user of the terminal 4. The connection via the second network between the server 34 and the device 4 can thus be two-way. Referring again to FIG. 5, the warning parameter for terminal 4 here is set to OK.

To associate the identification data of the terminal and the identification data of the device 1 within the database 37, one can proceed for example as follows: the device or one of the objects related to it, for example its packaging, is supplied with graphically encoded data such as a bar code or QR code, which the user can scan with an image capturing device of the terminal. This method continues with the terminal sending a message to the server containing both the identification data of the terminal and of the device (data from the QRC). For example, in the case where the terminal 4 is a smart phone typically comprising an image capturing module 45 (FIG. 1), the user can use his or her terminal to scan the QR code of the device 1, the reading of the QR code by the terminal enabling it to derive the identification data of the device 1 and then transmit it to the server 34. Alternatively, the method can consist of the user associating the terminal 4 with the device 1 via a service accessible through the Internet. In this service, the identification data of the warning device 1 may be a PIN number, a user id, or a password, on the packaging of the device or communicated at checkout when purchasing the device 1. In addition to this code, the user further provides the identification data of the terminal 4 (international mobile equipment identity (MEI) or any other terminal identification data) to an online service platform.

In addition to the above-mentioned image capturing module 45, the terminal 4 comprises a communication interface 41 with the second network, a memory 42, a processor 43, and a user interface such as a display screen 44. The memory 42 stores computer program code instructions for the execution by the processor 43 of an application related to the invention. The processor 43 is thus configured to process the alert message in order to display the corresponding data on the screen 44. This data may typically be an identifier of the warning device 1 and its current position (originating from geolocation data).

Figure 6:
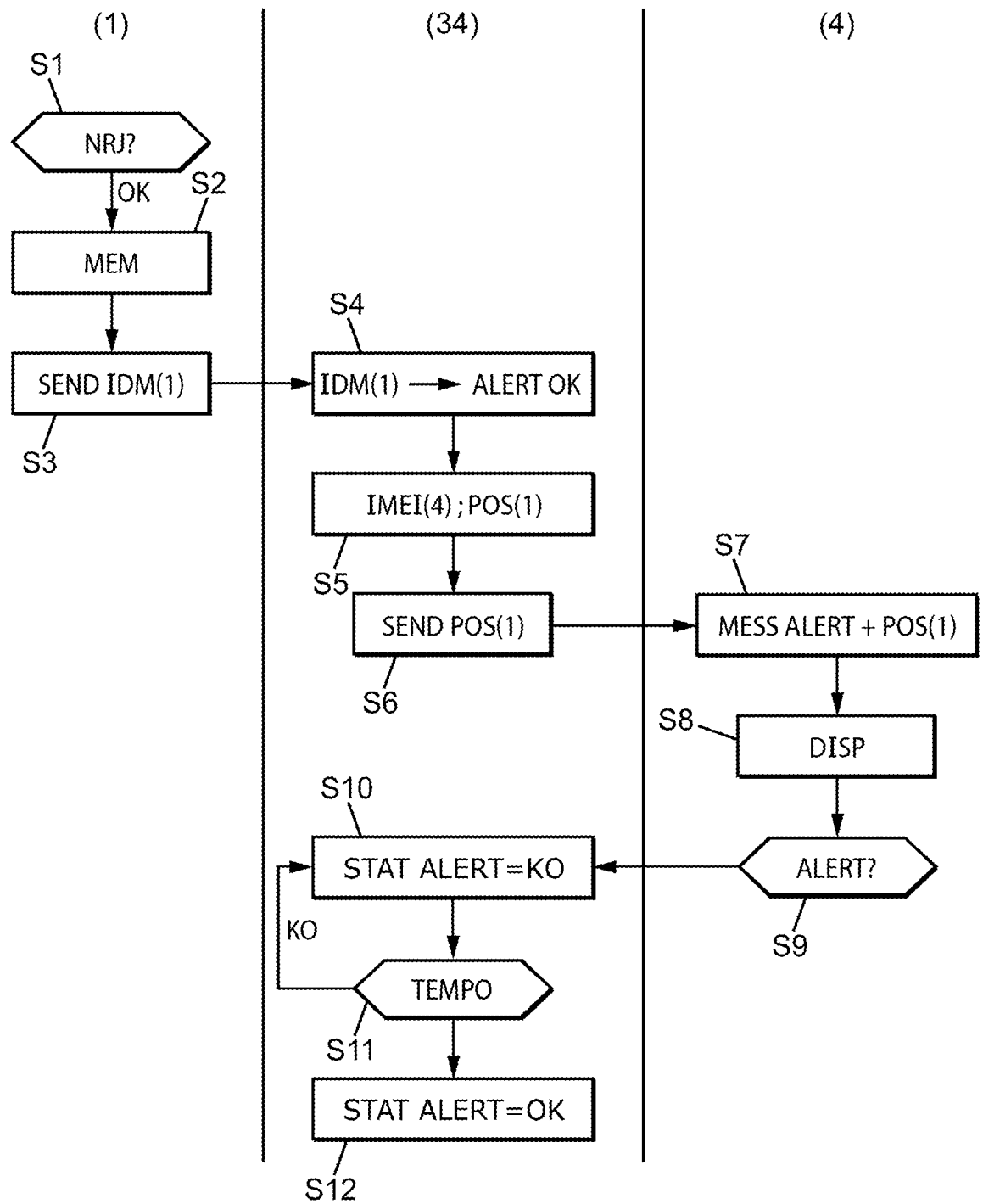
FIG. 6 illustrates a method for emitting an alert message, particularly in case of theft of a vehicle.

An exemplary embodiment of a method according to the invention is now described with particular reference to FIG. 6.

In a first step S1, once the electrical energy stored in the temporary energy accumulation module 12 exceeds a threshold, the temporary accumulation module supplies electrical energy to the processor 19. In step S2, the processor 19 reads the instructions of the computer program contained in the memory 18 in order to initiate preparing a communication. This communication comprises the identification data of the device 1, and, in practice, a separate service prefix or identifier so that the server 34 retains the communications intended for it according for example to the LoRa protocol. The service identifier may also be stored in addition in the memory 18. In step S3, the antenna 20 of the device 1 sends the communication to the network 3.

In step S4, the server 34 processes the content of the communication.

More specifically, the server 34 recognizes the service identifier in the communications sent to it by the antennas 30 of the network 3. From this service identifier, the server 34 retains the communications intended for it and also identifies the warning devices in the retained communications, based on their identification data. The server 34 is then able to group communications from the same warning device IDM and received from a plurality of antennas 31, 32, 33.

The server 34 can thus estimate the current position of each warning device, typically by triangulation. The server 34 can then update the database with the new geolocation data for example.

Thus, the processor 38 of the server 34 can map the identification data (IDM(1) for example) contained in one or more communication(s) for the same warning device 1, to the contents of the database 37 associated with the identifier IDM(1) of the device 1.

Once these data are retrieved, in step S4, the processor of the server 34 determines the value of the warning parameter as stored in the database. If this value is OK, in step S5 the processor 38 retrieves the identification data of the terminal. In addition, it retrieves the associated geolocation data. It then generates a signal to the communication interface 35 in step S6, to send the alert message, with the terminal identification data 4 as the address data of the alert message, the alert message including the identification data IDM(1) of the warning device 1 that emitted the communication and possibly its geolocation data.

In step S7, the communication interface 41 of the terminal 4 receives the alert message sent by the server 34. The processor 43 of the terminal then processes the alert message. More specifically, it can extract for example the identifier of the warning device 1 and possibly its current position (according to the geolocation data). In step S8, the processor 43 of the terminal generates a notification indicating that an alert message has been received, and it controls the screen 44 to display the notification, possibly with the position of the device 1.

In step S9, the user can modify the configuration for emitting alert messages through the network. More specifically, the user can choose to receive or not receive alert messages. For example, to do this, the user of the terminal 4 interacts with an interface of the application executing on his or her terminal to be notified of alert messages and to change the value of the warning parameter associated with the terminal (OK or KO). A change in this value can be communicated back to the server 34. Thus, if the current value of this parameter is OK, the user can disable the sending of alert messages by changing this value to take the new value KO. This situation can occur if the person who is currently using the vehicle is authorized to do so. This typically can be the user of the terminal. The user can thus disable the issuing of alert messages at least for a predetermined period of time, as described in detail below.

In a step S10 carried out at the server 34, the value of the warning parameter in the database 37 can be updated. More specifically, the value of the warning parameter is updated in response to the communication interface 35 receiving information representing a change in the warning parameter (OK to KO in the example shown in FIG. 6).

Optionally, in step S11, following a change in the value of the warning parameter, this value remains KO for a certain period. This period may be limited for security reasons, for example to one or two hours. This implementation can correspond to the case where the user takes the bicycle and forgets for example to disable the warning system. In the first minute of use, the user receives a notification on his or her terminal indicating that the bicycle is in motion. In this case, the user can disable the warning on the server and the corresponding value is set to KO. However, after using the bicycle for a period of an hour or two for example, the user may forget to reactivate the warning system. The corresponding value changes to OK on the server at the end of this period of time, for example an hour or two. Thus, in step S12, at the end of this period, the value of the warning parameter contained in the database 37 can again be changed to OK in order to reinitiate alert messages when necessary.

The invention has several advantages.

First, the use of an energy recovery unit based solely on rotation of the vehicle wheel allows the device 1 to be autonomous from an energy point of view. The device has no battery and does not require electrically recharging.

Furthermore, the telecommunication module 13 of the device of the invention provides a very advantageous operation. The telecommunication module only requires low electric power, which can be generated by the rotation of a wheel, in particular of a bicycle. Moreover, the LPWA protocol allows the telecommunication module of the device to have a wide range with low power consumption.

In addition, the device is simple to install on the vehicle and can be associated with a terminal very quickly in a database.

Furthermore, the elements of the device (the energy recovery unit, the temporary energy accumulation module or the telecommunication module) can be simple and robust such that the device according to the invention is inexpensive. It is stressed here that the communication is only sent in case of motion of the vehicle, without requiring the implementation of complex service logic on the device. Indeed, the communication is sent only when electrical energy is supplied and therefore by the rotation of the wheel.

The invention claimed is:

1. An autonomous warning device which warns of motion of a vehicle, the device comprising:
   an electrical energy recovery unit for recovering energy generated by rotation of a wheel of the vehicle,
   a temporary accumulation module for storing at least a portion of the electrical energy and for supplying electrical energy in response to reaching or exceeding a threshold value for the electrical energy stored in the temporary accumulation module, and
   a telecommunication module adapted to be supplied power by the temporary accumulation module, and configured to emit, as a consequence of its being supplied with electrical energy by the temporary accumulation module, a communication to a network in order to send an alert message to a terminal, the reaching of the threshold value being characteristic of the vehicle motion.

2. The device according to claim 1, wherein the telecommunication module comprises a memory which stores identification data of the device in order to establish, in a database connected to the network, an association between the identification data of the device and data representative of an address of the terminal.

3. The device according to claim 2, wherein the communication comprises the identification data of the device and is sent to the network in broadcast mode.

4. The device according to claim 1, wherein the network is a wide area wireless network, based on a Low Power Wide Area (LPWA protocol).

5. The device according to claim 1, wherein the energy recovery unit is adapted to convert at least a portion of the mechanical energy supplied by the rotation of the vehicle wheel into electrical energy.

6. The device according to claim 5, wherein the energy recovery unit comprises at least a first magnet fixed to the wheel and a second magnet fixed to the vehicle and immobile within the reference system of the vehicle, such that the rotational motion of the vehicle wheel causes an interaction between the first and second magnets, generating electrical energy.

7. The device according to claim 6, wherein the temporary accumulation module is connected to the second magnet.

8. The device according to claim 5, wherein the energy recovery unit comprises a dynamo.

9. A method for emitting an alert message in the event of motion of a vehicle having the autonomous device according to claim 1, the method comprising at least the following actions implemented in the autonomous device:
   as a consequence of its being supplied with electrical energy from the temporary energy accumulation module, supplied in response to reaching or exceeding a threshold value for the electrical energy stored in the temporary accumulation module, the electrical energy being generated by rotation of the vehicle wheel, generating a communication for the purposes of sending an alert message to the terminal, the reaching of the threshold value being characteristic of the vehicle motion, and
   controlling the telecommunication module to send the communication to the network.

10. The method according to claim 9, wherein the communication comprises identification data of the device, the method further comprising the following actions implemented by a server connected to the network:
- upon receipt of the communication, identifying an address of the terminal in a database connected to the server and having an association between the identification data of the device and data representative of an address of the terminal, and
- emitting the alert message to the address of the terminal, via a second network.

11. The method according to claim 10, wherein, upon receipt of the communication, the server determines geolocation data representative of the current position of the device and sends them to the terminal.

12. The method according to claim 11, wherein the communication is sent via the network in broadcast mode and is received by a plurality of antennas of the network, the server being able to determine the geolocation data by triangulation.

13. A non-transitory computer-readable storage medium comprising computer program instructions, the execution of which by a processor causing actions of the method according to claim 9.

* * * * *